(12) United States Patent
Toyoda et al.

(10) Patent No.: US 6,485,596 B1
(45) Date of Patent: Nov. 26, 2002

(54) THREE-DIMENSIONAL STRUCTURE TRANSFER METHOD AND APPARATUS

(75) Inventors: Osamu Toyoda, Kawasaki (JP); Akira Tokai, Kawasaki (JP); Motonari Kifune, Kawasaki (JP); Keiichi Betsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 140 days.

(21) Appl. No.: 09/660,336

(22) Filed: Sep. 12, 2000

(30) Foreign Application Priority Data

Nov. 17, 1999 (JP) .............................. 11-327124

(51) Int. Cl.⁷ .................. B44C 1/16; B32B 31/20; B29C 41/00; B28B 7/00; G02F 1/1339
(52) U.S. Cl. ................ 156/232; 156/230; 156/240; 156/247; 156/289; 156/245; 156/246; 427/146; 427/96; 427/271; 264/1.34; 264/1.38; 264/313; 349/156; 349/160
(58) Field of Search .................. 156/230, 231, 156/232, 238, 240, 241, 247, 289, 244.15, 245, 246, 540; 427/146, 147, 148, 96, 271; 264/1.34, 1.6, 1.7, 1.38, 297.7, 313; 101/389.1, 382.1; 348/155, 156, 158, 160

(56) References Cited

U.S. PATENT DOCUMENTS

| | | | | |
|---|---|---|---|---|
| 2,303,395 A | * | 12/1942 | Schultz et al. | 264/246 |
| 3,670,646 A | * | 6/1972 | Welch, Jr. | 101/382 MV |
| 5,853,446 A | * | 12/1998 | Carre et al. | 65/17.3 |
| 6,110,401 A | * | 8/2000 | Lee et al. | 264/1.34 |
| 6,136,128 A | * | 10/2000 | Chung | 156/235 |
| 6,251,208 B1 | * | 6/2001 | Serizawa et al. | 156/232 |

FOREIGN PATENT DOCUMENTS

| | | |
|---|---|---|
| JP | 09-134676 | 5/1997 |
| JP | 10-326560 | 12/1998 |

* cited by examiner

Primary Examiner—Jerry A. Lorengo
(74) Attorney, Agent, or Firm—Armstrong, Westerman & Hattori, LLP (57) ABSTRACT

A method for transferring a three-dimensional structure onto a substrate, which includes filling a plurality of concaves arranged on a sheet-form mold with a paste-like structural material, temporarily fixing the mold to a support member, contact-bonding the structural material in a state in which the structural material has the adhesion property or bonding property to the substrate together with the mold, releasing the temporary fixation of the mold by the support member after the contact-bonding, and removing the mold from the substrate, thereby transferring a three-dimensional structure onto the substrate.

10 Claims, 9 Drawing Sheets

ABSTRACT# THREE-DIMENSIONAL STRUCTURE TRANSFER METHOD AND APPARATUS

CROSS-REFERENCES TO RELATED APPLICATION

This application is related to Japanese patent application No. HEI 11-327124 filed on Nov. 17, 1999 whose priority is claimed under 35 USC §119, the disclosure of which is incorporated herein by reference in its entirety.

FIELD OF THE INVENTION

The present invention relates to a three-dimensional structure transfer method and apparatus, and more particularly to a three-dimensional structure transfer method and apparatus for manufacturing a substrate having a three-dimensional structure such as a barrier rib in a display region between a glass substrate on the front face side and a glass substrate on the back face side as in a plasma display panel (PDP), for example.

DESCRIPTION OF THE RELATED ART

As an example of the substrate having a three-dimensional structure, a PDP substrate having a barrier rib will be described below. The PDP is a display panel of a self-luminous type in which a pair of substrates (usually, glass substrates) are opposed to each other with a very small space and the surroundings are sealed to form a discharge space therein.

In general, the PDP has a barrier rib (three-dimensional structure) having a height of approximately 100 to 200 μm provided periodically to partition a discharge space. For example, in a surface discharge type PDP suitable for color display using a phosphor, a barrier rib which is rectilinear or grid-shaped as seen in a plane is provided on a substrate having data electrodes (address electrodes) arranged thereon. The barrier rib prevents the interference of discharge and the crosstalk of colors.

A method of fabricating the PDP substrate having the above-mentioned structure generally comprises a process for forming data electrode pattern on a glass substrate and forming a barrier ribs to make alignment with the electrode pattern. Various methods of forming barrier ribs have been proposed and carried out. Typical examples of the forming methods include a screen printing method of repeating screen printing to print laminated barrier ribs, a sand blasting method of spraying blast particles to carry out cutting, an embedding method of embedding a barrier rib material in the concave portion of a photosensitive material layer and removing the photosensitive material layer, a photolithographic method using a photosensitive material for barrier ribs and a transfer method of transferring barrier ribs onto a substrate by using a mother die for transfer (mold). In particular, attention has been paid to the transfer method which can be implemented at the lowest cost.

In the transfer method, a mold provided with trenches or concaves for forming barrier ribs is used. In the procedure, the concaves of the mold is filled with a barrier rib material and is then transferred onto a substrate so that barrier ribs are formed.

Various techniques have been proposed for transferring a barrier rib material in the transfer method. For example, Japanese Laid-Open Patent Publication No. Hei 9(1997)-134676 has described a method of filling an intaglio with a barrier rib material and then transferring the barrier rib material onto a substrate through heat press. However, in the case in which a heat treatment is to be carried out, it is necessary to consider expansion of the intaglio, barrier rib material and a substrate and the like. In particular, when crossing three-dimensional structure patterns are to be superposed, a very complicated calculation is required. In order to eliminate this drawback, it is desirable that transfer should be carried out at room temperature in principle.

As a method of removing the mold for the transfer method, there have been known a planographic transfer and removal (the whole pattern is transferred and then the mold is removed) method of carrying out transfer with a planar mold and removing the planar mold while keeping its nearly planar shape and a curved transfer (removal is carried out immediately after transfer) method using a roller for carrying out removal while performing transfer with a curved mold provided along a roller face.

Examples of transfer techniques used for the transfer method which are carried out at a room temperature include an adhesion transfer technique using an adherent material as described in Japanese Laid-Open Patent Publication No. Hei 10(1998)-326560. In the adhesion transfer method, the transfer can be carried out at room temperature. Therefore, there is an advantage that transfer can be implemented with high dimensional precision.

However, in the case in which a barrier rib is to be transferred by the planographic transfer and removing method using the above-mentioned technique, it is necessary to maintain a substrate and a mold in parallel with each other in order to align electrodes formed on the substrate with barrier ribs to be transferred and formed. Therefore, the mold should necessarily be removed vertically from the substrate after the transfer. For this reason, considerable force is required for the removal of the mold. If the adhesion strength between a transfer material and the substrate and the strength of the transfer material itself are not sufficiently great, a structure to be transferred is broken during the transfer or the transfer cannot be carried out.

In the case in which the barrier ribs are to be transferred by the curved transfer method using the above adhesion transfer technique, it is necessary to fixedly wind up the mold around a roller, thereby carrying out the transfer and the removal at the same time. Therefore, if the adherent strength between the transfer material and the substrate is not sufficiently greater than that between the mold and the transfer material, an object to be transferred is wrinkled or the roller is stopped. This problem becomes much greater obstruction as an area to be transferred is increased.

SUMMARY OF THE INVENTION

In consideration of these circumstances, it is an object of the present invention to provide a three-dimensional structure transfer method and apparatus in which a sheet-form mold is temporarily fixed to a support member and the support member is utilized to contact-bond a structural material (transfer material) to the substrate together with the mold and then release the temporary fixation and peel the sheet-form mold from the substrate so that transfer can be carried out smoothly with high precision without a great influence by the adhesion strength and removing property of the structural material.

The present invention provides a method for a three-dimensional structure transfer method for transferring a three-dimensional structure onto a substrate, comprising the steps of: preparing a paste-like structural material which can exert an adhesion property or a bonding property after curing or semi-curing, filling a plurality of concaves arranged on a sheet-form mold with the paste-like structural material, and curing or semi-curing the paste-like structural material; temporarily fixing the mold to a support member; aligning the mold and a substrate and then contact-bonding the structural material in a state in which the structural material has the adhesion property or bonding property to the substrate together with the mold; releasing the temporary fixation of the mold by the support member after the contact-bonding; and removing the mold from the substrate, thereby transferring a three-dimensional structure onto the substrate.

In the present invention, after the sheet-form mold filled or coated with the structural material is temporarily fixed to the support member, the alignment of the relative positions of the mold and the substrate is carried out and the structural material is contact-bonded to the substrate together with the mold, and the mold is released from the support member through the release of the temporary fixation and the sheet-form mold is then peeled off the substrate. Thus, the three-dimensional structure is transferred and formed on the substrate.

According to the present invention, the transfer step is divided into two steps, that is, a contact-bonding (sticking) step and a removing step. At the removing step, it is possible to carry out the peeling which requires the least excessive force to be applied to the removal. Therefore, it is possible to greatly relieve limitations on the adhesion strength and mechanical strength of the structural material and the degree of the removing property of the mold. Thus, the three-dimensional structure can be transferred and formed with high precision in a large area.

DESCRIPTION OF THE PREFERRED EMBODIMENTS

The three-dimensional structure transfer method and apparatus according to the present invention can be suitably used mainly for the manufacture of a PDP.

In the present invention, the three-dimensional structure implies a three-dimensional structure having any shape which can be formed by impression. For example, in the case in which the present invention is applied to the manufacture of the PDP, a structure such as barrier ribs is equivalent to the three-dimensional structure.

In the sheet-form mold having a plurality of concaves (or trenches) arranged threron, the mother die for forming barrier ribs to be a three-dimensional structure is formed on a planar base material which can be bent freely, for example. The base material may be integral with the mother die or the mother die may be attached to the base material. The material for the mold and a fabricating method thereof are not particularly restricted and a well-known material and fabricating method can be used. In the present invention, the mold is preferably made of a silicone rubber based material, which has a relatively better removing property than a ceramic based material. Moreover, the base material preferably has some flexibility.

In consideration of mass production, it is desirable that the mold should be in the form of a roll sheet in which intaglios are arranged on a continuous sheet wound like a roll. In this case, it is preferable that sprocket holes for delivery should be provided on both ends of the roll sheet.

The paste-like structural material filled in the concaves of the sheet-form mold is generally referred to as a transfer material and implies a barrier rib material if the three-dimensional structure is the barrier ribs, for example. The barrier rib material is not particularly restricted but any of the well-known materials may be used. For example, it is possible to use a paste-like barrier rib material comprising low-melting glass powder, an inorganic filler, a binder resin and an organic solvent. After the paste-like barrier rib material is applied, the barrier rib material is cured or semi-cured such that an adhesion property or a bonding property can be expressed. The viscosity of the barrier rib material can properly be adjusted depending on the addition ratios of inorganic particulates, a thickener, an organic solvent, a plasticizer, a suspending agent and the like. In order to increase the adhesion property of the paste surface after curing or semi-curing, it is desirable that binder resin to be mixed should have a low glass transition point (Tg= approximately −60 to 20° C.).

The support member for temporarily fixing the mold may be planar or roll-shaped. If the structural material is transferred onto a planar substrate such as glass, it is desirable that the support member should be planar during support. Also, it is desirable that the planar support member should have flexibility. Such a support member can be constituted by a printing device in which a screen is provided with a tension in a horizontal frame and a plate having flexibility is supported on the screen, for example. In the case in which the mold is a roll sheet having a sprocket hole, it is desirable that a pin corresponding to the sprocket hole should be provided on the support member side. Consequently, the mold can be prealigned in the predetermined position of the support member.

In the present invention, the temporary fixing is preferably such that the structural material is contact-bonded to the substrate together with the mold and then the mold can be released from the support member.

The temporary fixation can be carried out by providing, on the support member, a grip mechanism such as a magnet, an electrostatic chuck or a vacuum chuck. In the case in which the magnet is used, a support plate having magnetism such as an iron plate or an invar plate is previously formed on the back face of the mold and the mold is fixed to the support member through a sheet-form rubber magnet. Thus, the temporary fixation can be carried out.

In the case in which the magnet is used as the grip mechanism, a permanent magnet does not always need to be used but an electromagnet may be used. In the case in which the electromagnet is used, the electromagnet may be mounted on the support member side and a support plate having magnetism may be mounted on the mold, a coating material having magnetism may applied to the mold, or powder having magnetism may be contained in the material for the mold.

In the case in which the mold is of a non-magnetic substance such as a resin, rubber or plastics, the fixing mechanism such as the vacuum chuck or electrostatic chuck is used for the temporary fixation.

It is desirable that the grip mechanism should be so constructed that the electromagnetic chuck, vacuum chuck or electrostatic chuck has a number of divided chuck regions and the temporary fixation of the mold is sequentially released by turning off switches of divided chuck regions.

Besides the above-mentioned grip mechanisms, the temporary fixation may be carried out by using, on the opposed surfaces of the mold and the support member, a magic tape or a removable adhesive having a small adhesion property. Alternatively, the temporary fixation may be carried out by using a structure in which a concave is formed on one of the opposed surfaces of the mold and the support member and a convex is formed on the other surface and they are fitted to each other. In this case, the concave and the convex may be directly formed on the opposed surfaces of the mold and the support member or a resinous structure which has been formed in advance may be attached to the opposed surfaces of the mold and the support member.

Also, the mold may be supported by previously attaching a base material having flexibility (for example, a support plate made of a thin stainless invar material) to the mold and pulling the base material at both ends to apply tension.

Examples of the substrate include a substrate formed of glass, quartz or silicon, and a substrate provided with a desirable structure such as an electrode, an insulating film, a dielectric layer or a protective film.

In the case in which the support member is a plane having flexibility, it is desirable that the alignment of the mold with the substrate should be carried out by opposing the mold to the substrate in parallel. This alignment can be carried out by previously providing a plurality of positioning marks (alignment marks) on the mold and the substrate, mounting the substrate on an alignment table which can be moved and rotated in a horizontal direction, temporarily fixing the mold to the support member and then moving and rotating the alignment table in the horizontal direction such that the alignment marks of the mold and the substrate are coincident with each other. The alignment marks of the mold and the substrate can accurately be coincident with each other by enlarging the alignment marks by means of a magnifying glass or the like.

The contact bonding of the structural material to the substrate and the release of the temporary fixation of the mold may be simultaneously carried out continuously from one end of the mold to another end. Alternatively, the temporary fixation of the mold may be released after the whole mold is stuck to the substrate.

It is desirable that the mold should be removed from the substrate by peeling the sheet-form mold off the substrate.

The mold is removed from the substrate and the three-dimensional structure has thus been transferred onto the substrate. If the three-dimensional structure is barrier ribs, for example, the barrier ribs can be finished by firing. The firing is carried out in a baking furnace. Firing atmosphere and firing temperature are varied depending on the types of the paste and the substrate. The firing is usually carried out in air or in a nitrogen atmosphere. The firing temperature is 500 to 580° C.

According to another aspect, the present invention provides a substrate assembly having the three-dimensional structure formed by the above method, and a plasma display panel manufactured by using the above substrate assembly.

According to still another aspect, the present invention provides a three-dimensional structure transfer apparatus, comprising: a delivery mechanism for delivering a sheet-form mold having a plurality of concaves arranged thereon, the concaves being filled with a structural material having an adhesion property or a bonding property; a support member for temporarily fixing the mold delivered by the delivery mechanism; a stage for mounting the substrate and moving the position of the substrate in parallel with the support member, thereby aligning the mold with the substrate; a roll press mechanism for, after aligning the mold with the substrate, pressing a back face of the mold with a roller, thereby contact-bonding the structural material in a state in which the structural material has an adhesion property or a bonding property to the substrate together with the mold; a release mechanism for releasing the temporary fixation of the mold after the pressing by the roll press mechanism; and a removing mechanism for removing the mold from the substrate.

In the present apparatus, it is desirable that the mold should be used in the form of a roll sheet in which intaglios are arranged on a continuous sheet wound in a roll. In this case, it is preferable that a delivery mechanism should be provided with sprockets and sprocket holes for delivery should be mounted on both ends of the roll sheet.

The support member for temporarily fixing the mold can be constituted by a printing device in which a screen is provided with tension in a horizontal frame and a plate having flexibility is supported on the screen, for example. In the case in which the mold is the roll sheet having the sprocket holes, it is desirable that the support member should be provided with pins corresponding to the sprocket holes for prealigning the mold in a predetermined position.

It is desirable that the support member should be provided with a grip mechanism for temporarily fixing the mold. In this case, it is desirable that the grip mechanism should be constituted by an electromagnetic chuck, a vacuum chuck or an electrostatic chuck which can sequentially release the temporary fixation of the mold by partially turning off the switches of divided chuck regions.

It is desirable that the mold and the substrate should be provided with alignment marks for aligning both of them. Moreover, it is desirable that a stage should be provided with an alignment table on which the substrate can be placed and can be moved and rotated in a horizontal direction such that the alignment marks of the mold and the substrate are coincident with each other after the mold is temporarily fixed to the support member.

Embodiments of the present invention will be described below in detail with reference to the drawings. However, the present invention is not restricted to the embodiments.

Figure 1:
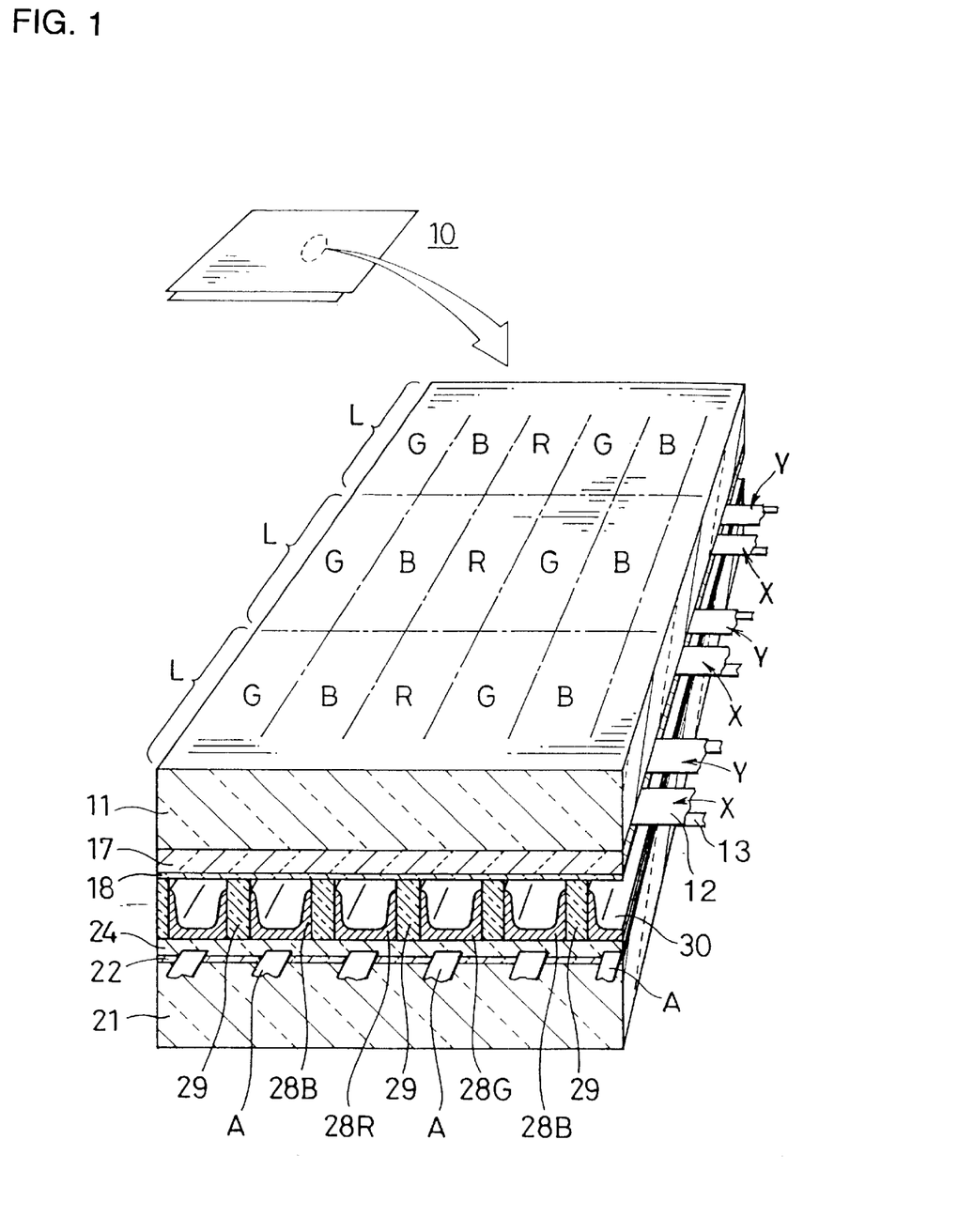
FIG. 1 is a perspective view showing the structure of a PDP to be manufactured using a three-dimensional structure transfer method and apparatus according to the present invention.

FIG. 1 is a perspective view showing the structure of a PDP comprising barrier ribs manufactured by using the three-dimensional structure transfer method and apparatus according to the present invention.

In FIG. 1, the reference numeral 10 denotes a PDP of a three-electrode surface discharge type in an AC driving mode. The PDP 10 is constituted by a substrate 11 on the front face side and a substrate 21 on the back face side which are formed of glass.

Sustain electrodes X and Y for surface discharge generation are horizontally provided in almost parallel for each display line L on the inner face of the substrate 11 at the front face side, and a dielectric layer 17 and a protective film 18 made of MgO are formed thereon. Since the sustain electrodes X and Y are to be provided on the substrate at the front face side, they are formed of a transparent electrode 12 of ITO and a metal electrode (bus electrode) 13 of Cr/Cu/Cr.

An under layer 22, a plurality of address (data) electrodes A for the generation of an address discharge and a dielectric layer 24 are sequentially formed on the inner face of the substrate 21 at the back face side, and a large number of stripe-shaped barrier ribs 29 for physically partitioning discharges are provided in almost parallel to a vertical direction (intersecting the sustain electrode) such that the address electrodes A are interposed between the barrier ribs. Phosphor layers 28R, 28G and 28B are formed in slots (concave portions) between the barrier ribs. The layout pattern of three colors is a stripe pattern in which cells in one column have the same luminescent color and the adjacent columns have different luminescent colors.

A discharge space 30 is filled with a discharge gas of a mixture of xenon with neon as a main component (a charged pressure of approximately 500 Torr), and the phosphor layers 28R, 28G and 28B are locally excited by ultraviolet rays emitted from the xenon during the discharge and emit light.

Next, description will be given to methods of forming the barrier rib 29 by using the three-dimensional structure transfer method and apparatus according to the present invention.

First Embodiment

FIGS. 2A to 2D and FIGS. 3A to 3C are views sequentially showing the steps of a three-dimensional structure transfer method according to a first embodiment.

Barrier Rib Material Filling Step

Figure 2A:
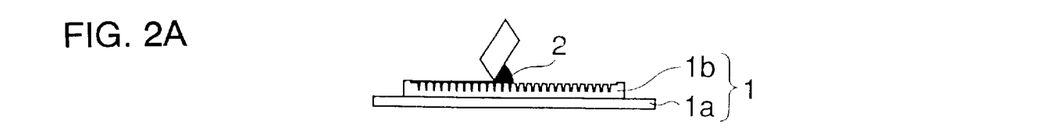
FIGS. 2A to 2D are views sequentially illustrating the steps of the three-dimensional structure transfer method according to a first embodiment of the present invention.

First of all, a paste-like barrier rib material 2 is filled by coating in concaves of a sheet-form mold 1 having a mother die of barrier ribs formed thereon, and is then cured or semi-cured such that an adhesion property or a bonding property can be exerted at a subsequent contact bonding step (see FIG. 2A).

The sheet-form mold 1 has a base material 1a and a mother die 1b of the barrier ribs integrated, and is fabricated by a known method using a silicone rubber based material. The mold 1 is planar and can be bent freely.

For the paste-like barrier rib material 2, is used a low-melting glass paste containing, in a vehicle, such an adherent resin as expresses an adhesion property after curing or a low-melting glass paste containing, in a vehicle, such a resin as expresses the adhesion property by irradiation of ultraviolet rays after the curing.

In the case in which the low-melting glass paste containing an ultraviolet curing resin in a vehicle is used, it is maintained in such a semi-curing state that ultraviolet curing does not take place completely at this time. It is desirable that a plasticizer or a thickener should be mixed to hold proper softness and the adhesion property for the barrier rib materials in the curing or semi-curing state.

Temporary Fixing Step

Figure 2B:
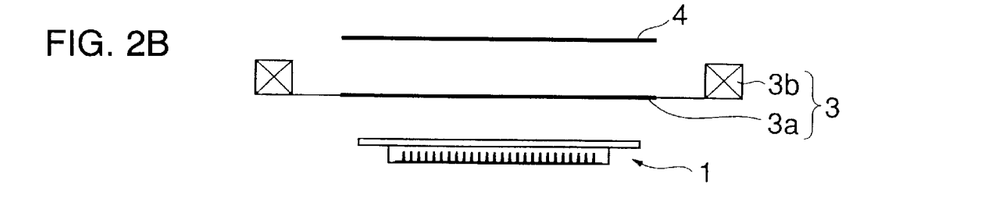

Next, the mold 1 filled with the barrier rib material 2 in the concaves corresponding to the barrier ribs is temporarily fixed to a support member 3 having a stainless plate 3a supported on a frame 3b with a mesh tension, for example, a printing device in which a stainless plate having flexibility in a thickness direction is stuck to the central portion of a printing screen (see FIG. 2B). The barrier rib material 2 is contact-bonded to the substrate together with the mold 1 and the mold 1 is then fixed temporarily to the support member 3 such that the mold 1 can be released from the support member 3.

The temporary fixation is carried out through a grip mechanism using a permanent magnet. More specifically, a support plate having magnetism such as an iron plate or an invar plate is previously formed on the base material 1a of the mold 1 and the mold 1 is fixed through the stainless plate 3a of the support member 3 by a sheet-form rubber magnet 4.

Figure 4:
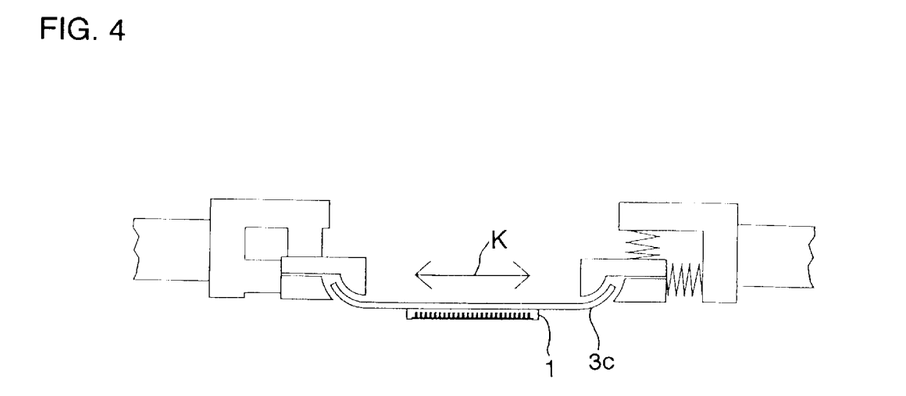
FIG. 4 is a view illustrating a state in which a mold is supported using a clamp support member according to the present invention.

At this step, as shown in FIG. 4, a base material 3c having flexibility (for example, a support plate fabricated by a thin stainless invar material) may previously be attached to the mold 1, both ends of the base material 3c may be clamped by a clamp support member 4 and the mold 1 may be pulled in a direction shown by an arrow K to apply tension. Thus, the mold 1 can be supported.

Alignment Step

Next, the support member 3 to which the mold 1 is temporarily fixed is opposed to the substrate 5 in parallel with a clearance of approximately 1 to 3 mm. Thus, the alignment of the relative positions of the mold 1 and the substrate 5 is carried out (see FIG. 2C).

The substrate 5 has such a structure that an under layer 22, address electrodes A and a dielectric layer 24 are formed on a substrate 21 at the back face side as shown in FIG. 1. In this case, the dielectric layer 24 does not need to be formed but may be formed through transfer simultaneously with the formation of barrier ribs by using a material other than the barrier rib material or the barrier rib material itself.

Figure 2C:
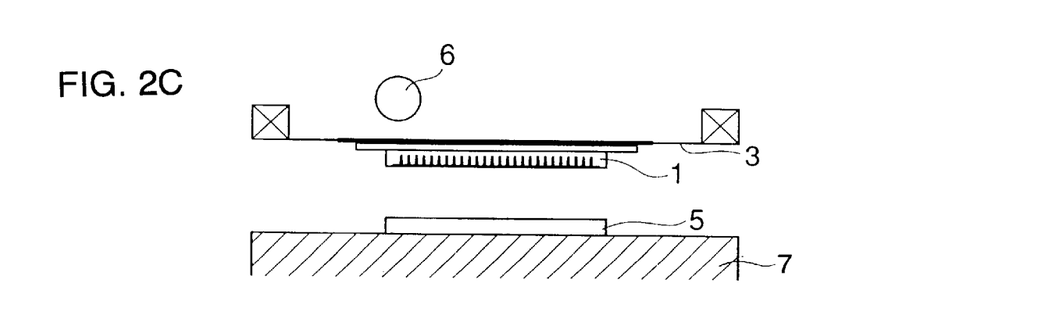

The alignment of the mold 1 and the substrate 5 is carried out as follows. A plurality of alignment marks are previously provided on the mold 1 and the substrate 5, and the substrate 5 is mounted on an alignment table 7 which can be moved and rotated in a horizontal direction. The alignment table 7 is moved and rotated in the horizontal direction such that the alignment marks of the mold 1 and the substrate 5 are coincident with each other.

Contact Bonding and Release Step

Figure 2D:
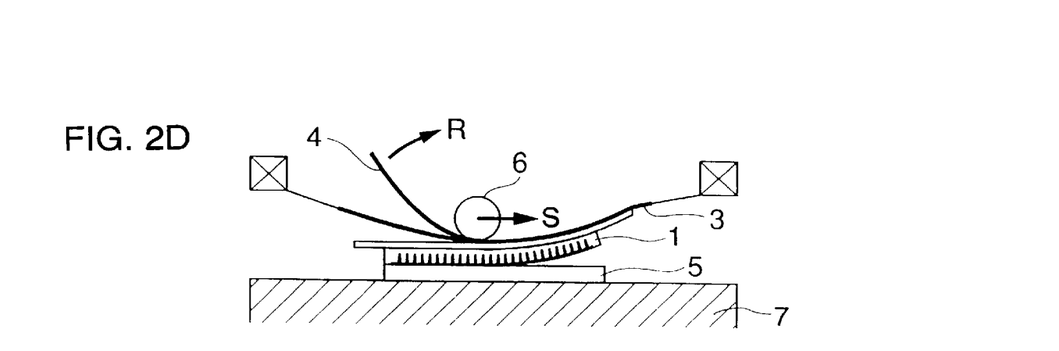
Figure 3A:
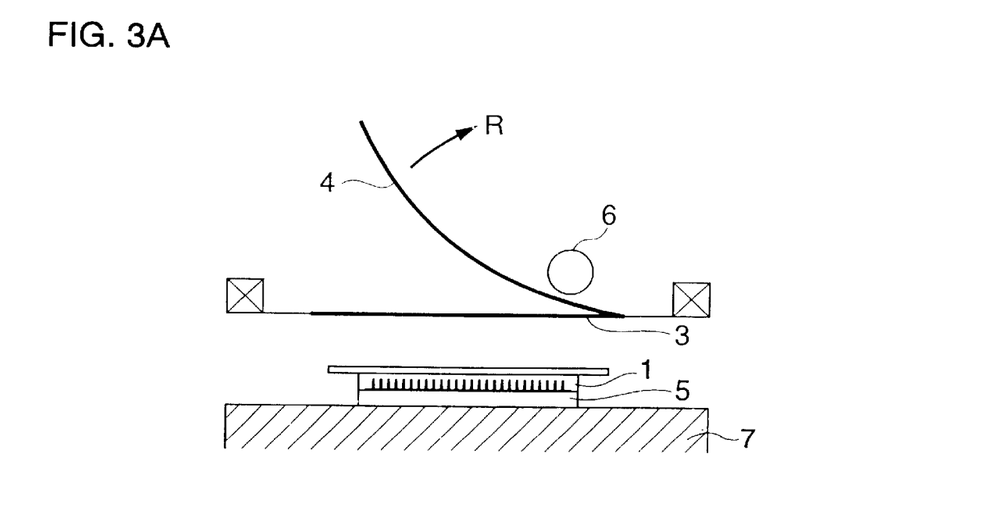
FIGS. 3A to 3C are views sequentially illustrating the steps of the three-dimensional structure transfer method according to the first embodiment of the present invention.
Figure 3B:
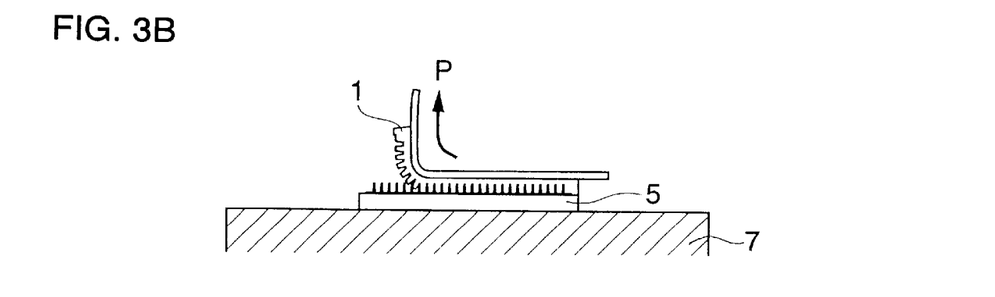
Figure 3C:
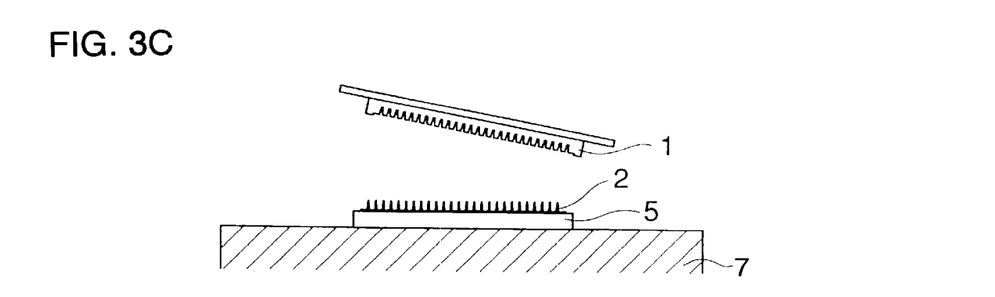

Next, a press roller 6 is moved in a direction shown by an arrow S while pressing the back face of the mold 1 through the support member 3. Thus, the barrier rib material 2 having an adhesion property or a bonding property is contact-bonded to the substrate 5 together with the mold 1. In the case in which the barrier rib material 2 is made of an ultraviolet curing material maintained in a semi-curing state, ultraviolet rays are partially irradiated from the back face side of the substrate 5 to completely cure the barrier rib material 2 and bond the barrier rib material 2 to the substrate 5, for example.

During the contact bonding, the release of the temporary fixation of the mold 1 is carried out continuously from one end of the mold 1 to another end simultaneously with the contact bonding of the barrier rib material 2 to the substrate 5. More specifically, the rubber magnet 4 on the back face of the mold 1 is peeled off in a direction shown by an arrow R simultaneously with the contact bonding so that the mold 1 is gradually released (see FIG. 2D). The mold 1 may be temporarily fixed through the grip mechanism such as an electromagnetic chuck, a vacuum chuck or an electrostatic chuck. In that case, a chuck region is divided in a number of regions in advance and a region where the temporary fixation is to be released is switched off. Thus, the temporary fixation by that region is released.

Thus, the temporary fixation state to the support member is gradually released while the mold 1 is contact-bonded to the substrate 5. Consequently, the mold 1 is released from the support member 3 with the mold 1 stuck to the substrate 5. Thus, the mold 1 is left on the substrate 5 (see FIG. 3A).

As shown in FIG. 4, in the case in which both ends of the mold 1 are clamped by the clamp support member 4c and the mold 1 is supported with tension, the clamping may be released after the contact bonding is completed.

Removing Step

After the mold 1 is contact-bonded, it is peeled from the substrate 5 as shown by an arrow P. Consequently, the mold 1 is removed from the substrate 5 (see FIG. 3B). At this time, it is preferable that a peel angle should be approximately 90°. It is desirable that the mold 1 should be peeled off while a support roll is rolled on the upper surface of the mold 1. Thus, the mold 1 is completely peeled off the substrate 5 and the barrier rib material is completely transferred (see FIG. 3C).

Then, the barrier ribs are finished by firing.

Second Embodiment

Figure 5A:
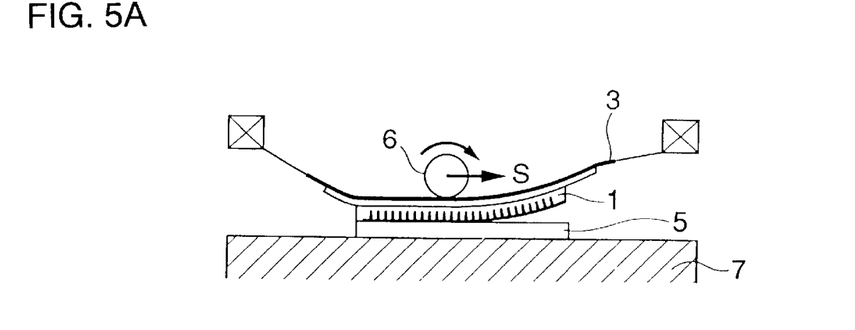
FIGS. 5A to 5C are views illustrating a three-dimensional structure transfer method according to a second embodiment of the present invention.
Figure 5B:
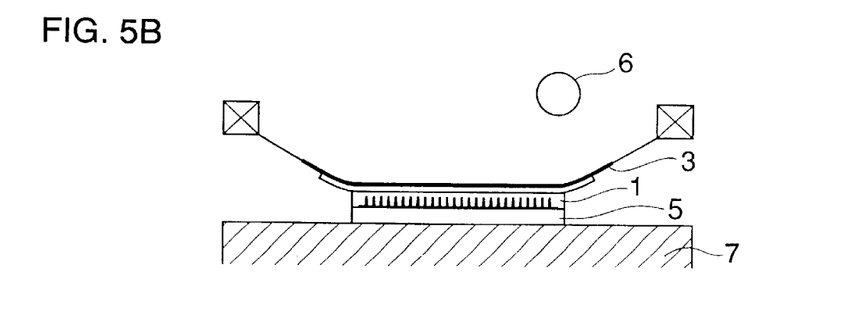
Figure 5C:
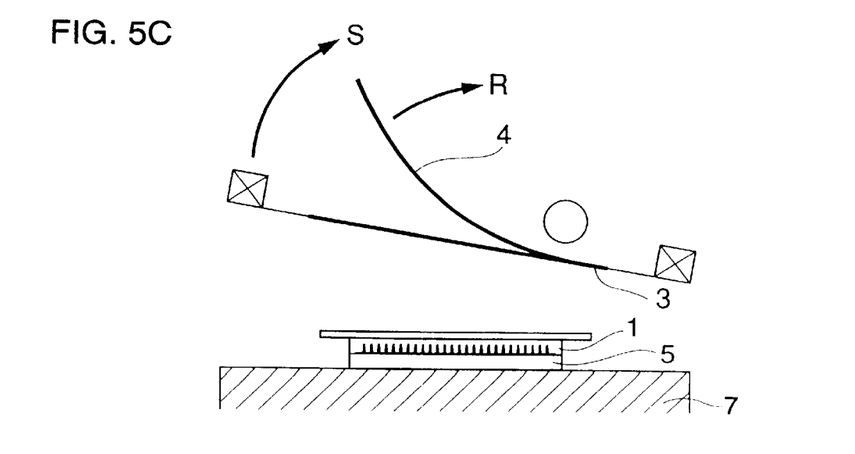

FIGS. 5A to 5C are views illustrating a three-dimensional structure transfer method according to a second embodiment.

Since a barrier rib material filling step, a temporary fixing step, an alignment step and a removing step according to the present embodiment are the same as those of the first embodiment, only contact bonding and release steps will be described below.

After the alignment step according to the first embodiment, if the clearance between the mold 1 and the substrate 5 can be maintained to be sufficiently small and excessive force is not applied to the mold 1, the temporary fixation of the mold 1 may be released after the whole mold 1 is stuck to the substrate 5 instead of releasing the temporary fixation to the support member during the contact bonding of the mold 1 to the substrate 5.

More specifically, a barrier rib material 2 is contact-bonded to the substrate 5 together with the mold 1 (see FIG. 5A). After the mold 1 is completely stuck to the substrate 5 (see FIG. 5B), a rubber magnet 4 is peeled off the back face of the mold 1 in a direction shown by an arrow R. Consequently, the temporary fixation is released at a time and the mold 1 is released as shown by an arrow S and is left on the substrate 5 (see FIG. 5C).

As shown in FIG. 4, in the case in which both ends of the mold 1 are clamped with the clamping support member 4c and tension is applied to support the mold 1, it is preferable that the clamp should be released after the contact bonding is completed in the same manner as in the first embodiment.

The subsequent removing step is the same as that in the first embodiment.

Third Embodiment

FIGS. 6A to 6D are views illustrating a three-dimensional structure transfer method according to a third embodiment.

In the present embodiment, a roll-from support member is used in place of the planar support member. In the present embodiment, a mold filled with a barrier rib material is temporarily fixed to a roll-form transfer jig and the temporary fixation is released while contact-bonding the mold to a substrate and the mold is then peeled in the same manner as in the first and second embodiments.

Figure 6A:
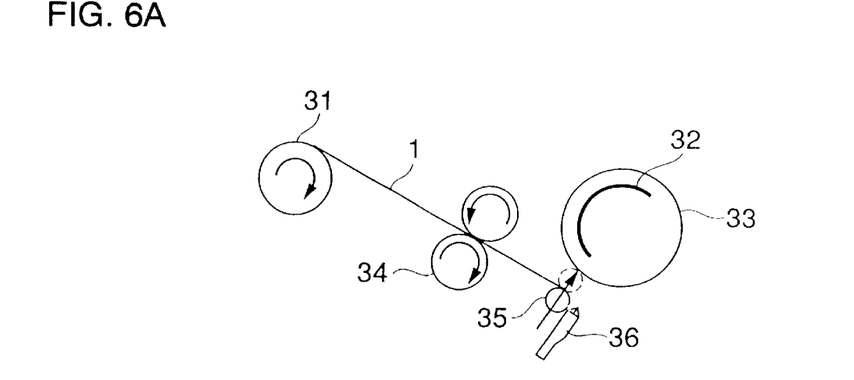
FIGS. 6A to 6D are views illustrating a three-dimensional structure transfer method according to a third embodiment of the present invention.

First of all, after a sheet-form mold is filled and coated with a paste-like barrier rib material, it is cured or semi-cured and is wound like a roll. Thus, a roll sheet 31 is prepared.

Then, the mold 1 is drawn out of the roll sheet 31 and is delivered through a pair of delivery rolls 34 to a roll-from transfer jig (laminate roll) 33 including a grip mechanism 32 such as an electromagnetic chuck, an electrostatic chuck or a vacuum chuck which has divided chuck regions (see FIG. 6A).

Figure 6B:
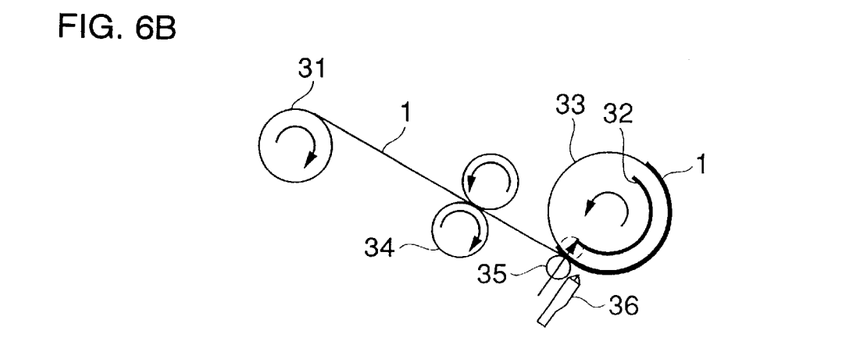
Figure 6C:
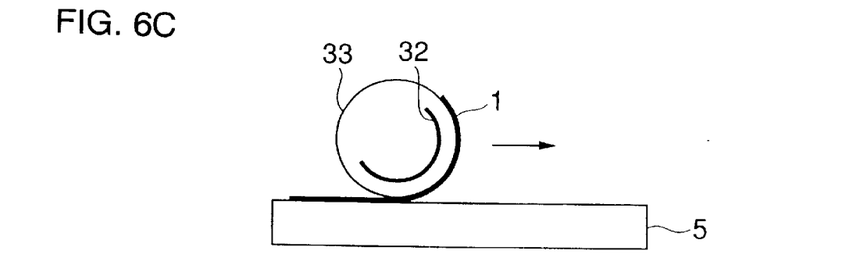
Figure 6D:
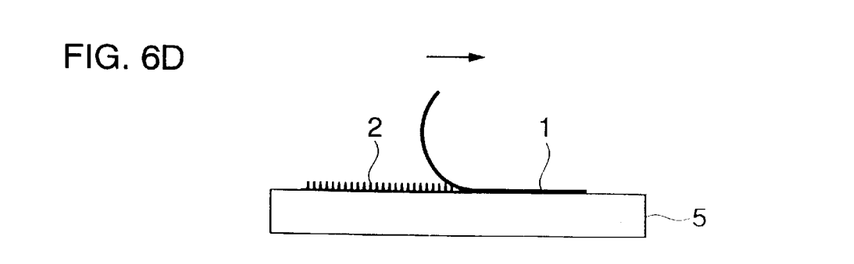

Next, the mold 1 thus delivered is wound around the roll-form transfer jig 33 and is delivered in a predetermined amount through a delivery gear 35, and is thus fixed temporarily (see FIG. 6B). During the wrapping, the mold 1 is wound around the roll-from transfer jig 33 in alignment so as to reach a predetermined position. After being wound, the roll sheet 31 is cut with a cutter 36 (mold fix cut).

The roll sheet 31 may be obtained by arranging molds each for one panel on a continuous sheet made of paper or resin at regular intervals or by providing the molds without intervals.

Sprocket holes are opened on both ends of the roll sheet 31. The sprocket holes are utilized for the delivery of the roll sheet 31, and furthermore, are utilized as a mechanism for prealignment to temporarily fix the roll sheet 31 to the roll-form transfer jig 33 and for alignment with the substrate.

Subsequently, the roll-form transfer jig 33 to which the mold 1 is fixed temporarily is aligned with the substrate 5. Then, the roll-form transfer jig 33 is pushed against the substrate 5 to contact-bond the barrier rib material 2 to the substrate 5 together with the mold 1 and the switches of the chuck regions of the grip mechanism 32 are sequentially turned off so as to release the temporary fixation successively. In other words, the temporary fixation is released sequentially from where the contact-bonding is completed (see FIG. 6C).

Thus, the mold 1 is stuck to the substrate 5. Then, the mold 1 is peeled and the barrier rib material 2 is transferred (see FIG. 6D). The removing step and succeeding steps are the same as those in the first embodiment.

Figure 7:
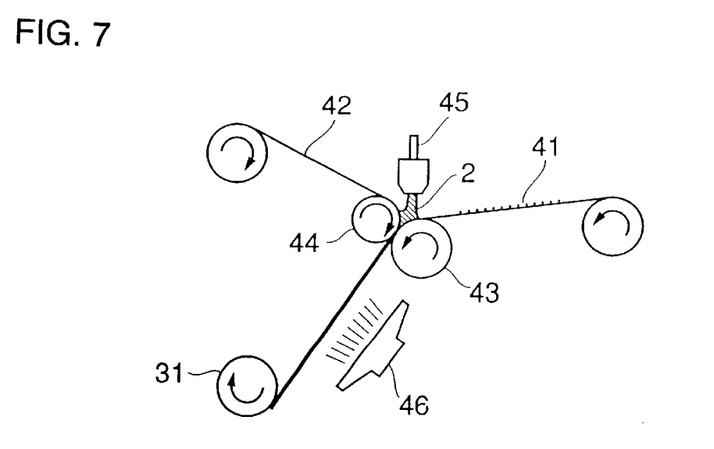
FIG. 7 is a view illustrating a general construction of an example of an apparatus for fabricating the roll sheet of a mold according to the present invention.

FIG. 7 is a view illustrating a general construction of an example of an apparatus for fabricating the roll sheet 31 of the mold. In the present example, the roll sheet 31 of the mold filled with a barrier rib material is fabricated. A material having no solvent evaporation or very slight solvent evaporation is used as the barrier rib material. For example, there is used a low-melting glass paste containing, in a vehicle, a resin expressing an adhesion property by irradiation of ultraviolet rays after curing or a low-melting glass paste containing an ultraviolet curing resin in a vehicle.

In the present apparatus, a mold sheet 41 wound around one roll and a cover sheet 42 wrapped around another roll are integrated through rollers 43 and 44, and the barrier rib material 2 is interposed and filled between both the sheets by using a die 45 during the integration. Then, proper ultraviolet rays are irradiated by a ultraviolet ray irradiating device 46 to cure or semi-cure the barrier rib material 2. The barrier rib material 2 is wound. Thus, the roll sheet 31 is fabricated.

When the mold filled with the barrier rib material 2 is used for the transfer, the cover sheet 42 is broken away in advance to carry out the transfer in the process according to the first to third embodiments.

Figure 8:
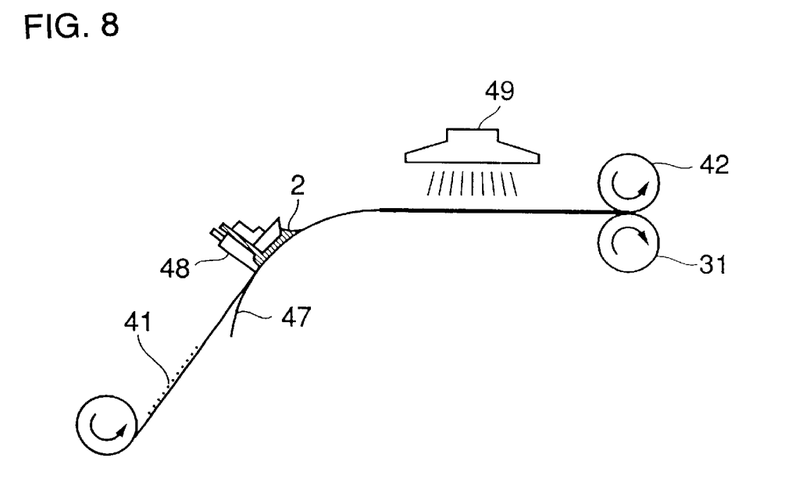
FIG. 8 is a view illustrating a general construction of another example of the apparatus for fabricating the roll sheet of the mold according to the present invention.

FIG. 8 is a view illustrating a general construction of another example of the apparatus for fabricating the roll sheet 31 of the mold. In the present example, a low-melting glass paste containing, in a vehicle, such an adherent resin as expresses an adhesion property after curing is used as the barrier rib material.

In the present apparatus, the mold sheet 41 wound around the roll is fed to a web 47 and the mold is filled with the barrier rib material 2 through a lip coater 48, then dried and cured through a heater 49 or a drying furnace covered with the cover sheet 42, if necessary, and wound. Thus, the roll sheet 31 is fabricated. The lip coater 48 is only an example and another coating device such as a slit coater may be used.

Figure 9:
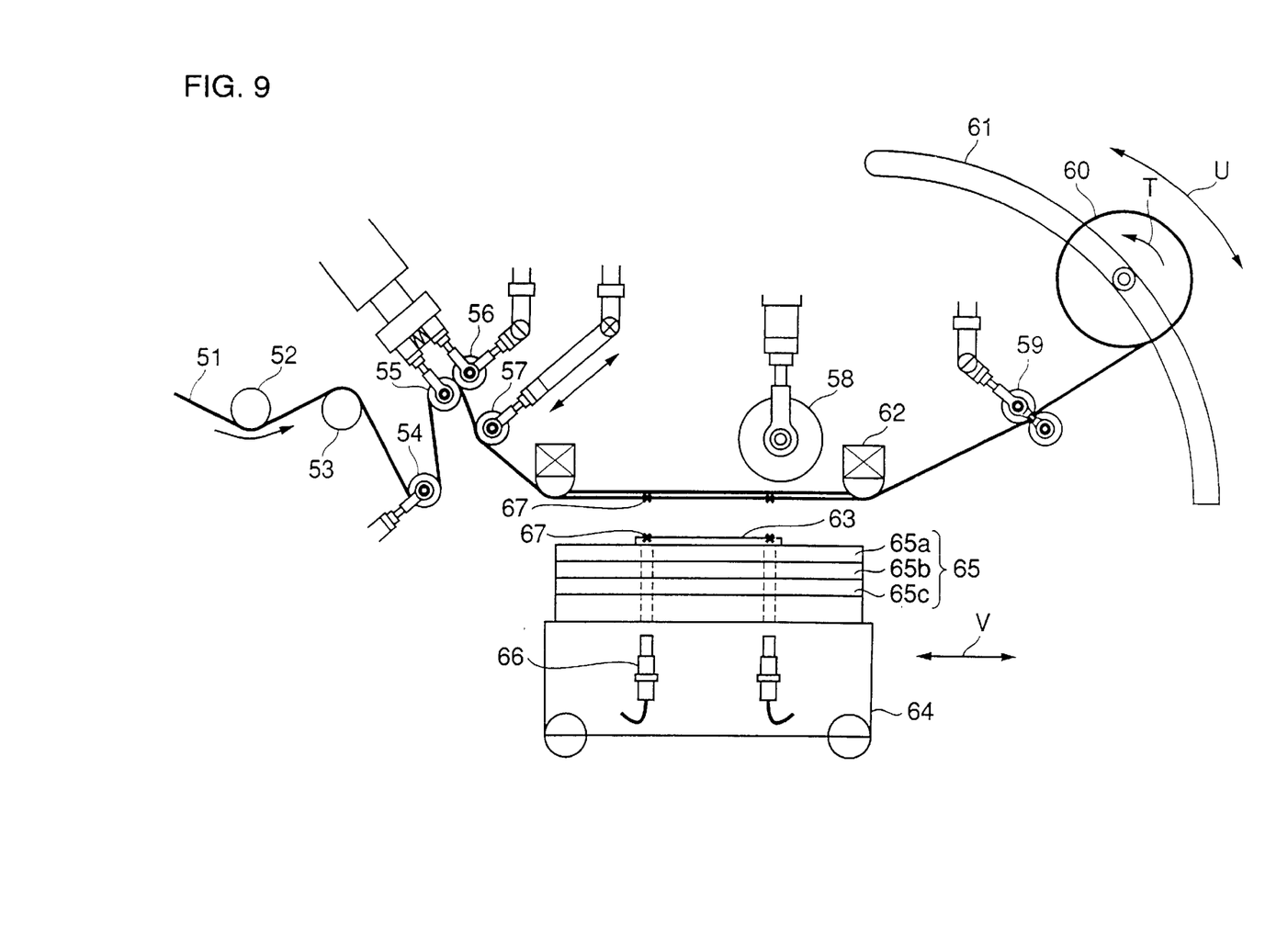
FIG. 9 is a view illustrating a three-dimensional structure transfer apparatus for implementing the method shown in the first embodiment of the present invention.

FIG. 9 is a view illustrating a three-dimensional structure transfer apparatus for implementing the method according to the first embodiment.

In FIG. 9, the reference numeral 51 denotes a mold sheet filled with a barrier rib material, the reference numerals 52, 53, 54, 55, 56 and 57 denote rollers, the reference numeral 58 denotes a press roller, the reference numeral 59 denotes a sprocket delivery mechanism, the reference numeral 60 denotes a winding roll, the reference numeral 61 denotes a guide rail for the winding roll, the reference numeral 62 denotes a support member for temporary fixation, the reference numeral 63 denotes a substrate, the reference numeral 64 denotes a stage, the reference numeral 65 denotes an alignment table arranged on a stage, the reference numeral 66 denotes a camera for alignment, and the reference numeral 67 denotes alignment marks provided on the mold sheet 51 and the substrate 63.

The roller 57 functions as a sheet tension buffer. The winding roll 60 can be moved in a direction shown by an arrow U. During removal, the winding roll 60 is moved upward in the figure along the guide rail 61 and is rotated in a direction shown by an arrow T to wind the mold sheet having no barrier rib material after the transfer.

Sprocket holes are opened on both ends of the mold sheet 51 and are utilized for the delivery of the mold sheet 51. Moreover, pins corresponding to the sprocket holes are provided on the support member 62 so that the mold sheet 51 can be prealigned in the predetermined position of the support member 62 through the sprocket holes and the pins. The sprocket holes of the mold sheet 51 are also utilized as a mechanism for alignment with the substrate 63.

The stage 64 can be moved in a direction shown by an arrow V and is moved rightward in the figure during the removal. The alignment table 65 is constituted by an X table 65a movable in the X direction, a Y table 65b movable in the Y direction and a rotary table 65c which is rotatable.

The alignment of the mold 51 with the substrate 63 is carried out by aligning the position of the alignment marks 67 through the camera 66 for alignment.

The support member 62 includes a grip mechanism such as an electromagnetic chuck, an electrostatic chuck or a vacuum chuck which serves to temporarily fix the mold sheet 51, which is not shown. The grip mechanism is provided with divided chuck regions. When the switches of the divided chuck regions are partially turned off, the temporary fixation of the mold sheet 51 is sequentially released.

A printing device such as a screen printing intaglio described in the first embodiment may be used for the support member 62. Moreover, in the case in which dimensional precision is permitted with the tension of the sheet itself, tension may be applied to support the mold sheet 51 as shown in FIG. 4.

Figure 10A:
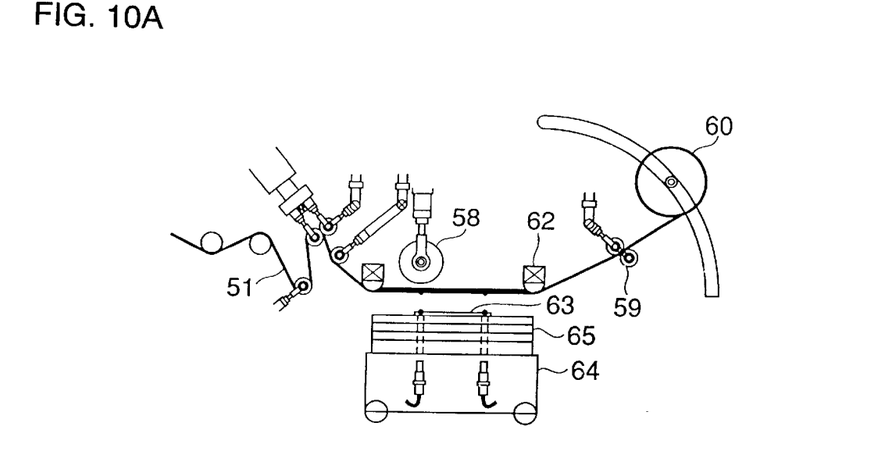
FIGS. 10A to 10C are views illustrating the operation of the three-dimensional structure transfer apparatus shown in FIG. 9.
Figure 10B:
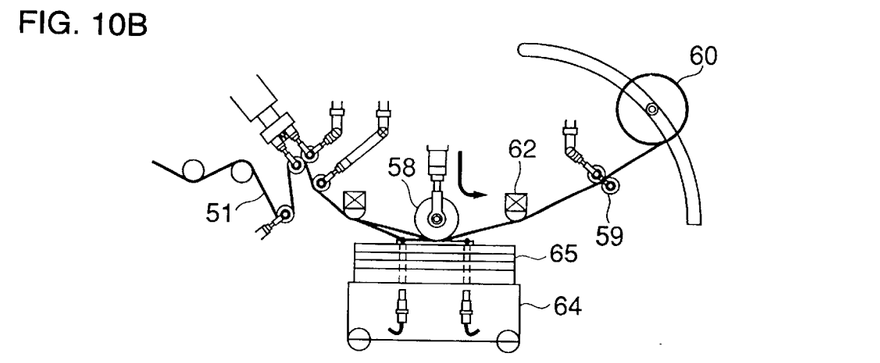
Figure 10C:
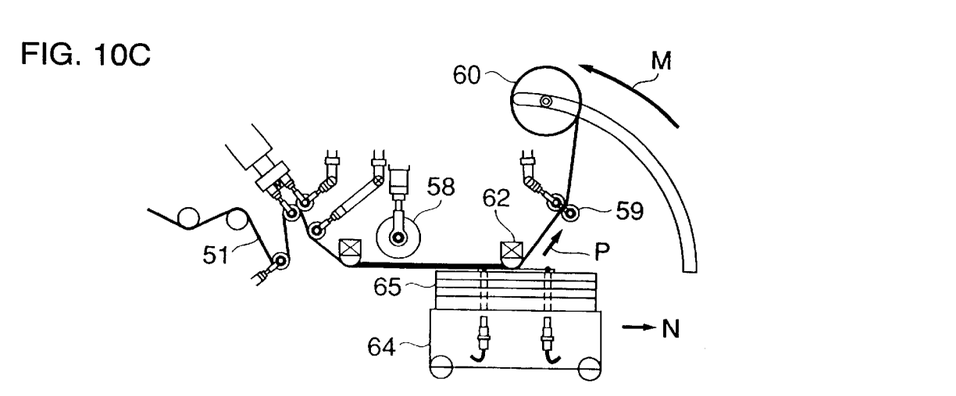

FIGS. 10A, 10B and 10C are views illustrating the operation of the three-dimensional structure transfer apparatus of FIG. 9, showing an example in which the formation of barrier ribs by transfer is continuously repeated.

First of all, the mold sheet 51 is wound up and a desired mold is moved to the position of the support member 62. Then, the mold is temporarily fixed to the support member 62 through the grip mechanism and the substrate 63 is moved through the alignment table 65 for the alignment of the mold with the substrate 63 (see FIG. 10A).

Next, roll press is carried out through the press roller 58 in a direction shown by an arrow L, and the barrier rib material is contact-bonded while at the same time the temporary fixation of the mold is sequentially released through the grip mechanism (see FIG. 10B).

Then, the press roller 58 is lifted up and is moved leftward in the figure, and the position of the winding roll 60 is moved in a direction shown by an arrow M to wind up the mold sheet 51. The stage 64 is moved in a direction shown by an arrow N synchronously with the movement of the mold sheet 51 so as to peel the mold off the substrate 63 in a direction shown by an arrow P (see FIG. 10C).

Thus, by using the sheet-form mold, temporarily fixing and contact-bonding the mold to the support member during the contact bonding of the barrier rib material and peeling by utilizing the sheet property of the mold during the removal of the mold, it is possible to relieve restrictions on the adhesion strength and mechanical strength of the structural material and the degree of the removing property of the mold considerably.

According to the present invention, the transfer step is divided into two steps, that is, the contact-bonding step and the removing step. At the removing step, the peeling which involves the application of the least excessive force for the removal can be carried out. Therefore, it is possible to enhance transfer precision through the transfer and formation of the three-dimensional structure using the mold and also to relieve the conditions on the adhesion strength and the removing property required of the structural material and the material for the mold. Consequently, the degree of freedom of material selectivity can be increased and the field of application of the present technique can also be widened.

What is claimed is:

1. A three-dimensional structure transfer method for transferring a three-dimensional structure onto a substrate, comprising the steps of:

preparing a paste-like material which can exert an adhesion property of a bonding property after curing or semi-curing, filling a plurality of concaves arranged on a sheet-form mold with the paste-like material, and curing or semi-curing the paste-like material;

temporarily fixing the sheet-form mold to a support member;

aligning the sheet-form mold and the substrate and then contact-bonding the paste-like material in a state in which the paste-like material has the adhesion property or bonding property to the substrate together with the sheet-form mold, using the support member;

releasing the temporary fixation of the sheet-form mold by the support member after the contact-bonding; and peeling the sheet-form mold from the substrate, thereby transferring a three-dimensional structure onto the substrate.

2. The three-dimensional structure transfer method according to claim 1, wherein the sheet-form mold is a roll sheet having the concaves arranged on a continuous sheet would like a roll.

3. The three-dimensional structure transfer method according to claim 2, wherein the roll sheet has sprocket holes for delivery provided on both ends and the support member has pins corresponding to the sprocket holes, thereby temporarily fixing the sheet-form mold to a predetermined position of the support member.

4. The three-dimensional structure transfer method according to claim 1, wherein the support member is formed of a printing device in which a screen is provided with tension in a horizontal frame and a plate having flexibility is supported on the screen.

5. The three-dimensional structure transfer method according to claim 1, wherein the support member includes a grip mechanism for temporarily fixing the sheet-form mold, the grip mechanism comprises an electromagnetic chuck, a vacuum chuck or an electrostatic chuck which has a number of divided chuck regions, and the temporary fixation of the sheet-form mold is sequentially released by turning off a switch of a divided chuck region to be released.

6. The three-dimensional structure transfer method according to claim 1, wherein the support member is constituted by a clamp mechanism for applying tension to the sheet-form mold by holding and pulling both ends of the sheet-form mold, thereby supporting the sheet-form mold.

7. The three-dimensional structure transfer method according to claim 1, wherein the alignment of the sheet-form mold and the substrate is carried out by previously providing a plurality of alignment on the sheet-form mold and the substrate, mounting the substrate on an alignment table which can be moved and rotated in a horizontal direction, temporarily fixing the sheet-form mold to the support member and then moving and rotating the alignment table in the horizontal direction such that the alignment marks of the sheet-form mold and the substrate are coincident with each other.

8. The three-dimensional structure transfer method according to claim 1, wherein the contact-bonding of the paste-like material to the substrate and the release of the temporary fixation of the sheet-form mold are carried out continuously from one end of the sheet-form mold to another end at the same time.

9. The three-dimensional structure transfer method according to clam 1, wherein the contact-bonding of the paste-like material to the substrate and the release of the temporary fixation of the sheet-form mold are carried out by sticking the whole sheet-form mold to the substrate and then releasing the temporary fixation of the sheet-form mold.

10. A three-dimensional structure transfer method for transferring a three-dimensional structure onto a substrate, comprising the steps of:

preparing a paste-like material which can exert an adhesion property of a bonding property after curing or semi-curing, filling a plurality of concaves arranged on a sheet-form mold with the paste-like material, and curing or semi-curing the paste-like material;

temporarily fixing the sheet-form mold to a support member;

aligning the sheet-form mold and the substrate and then contact-bonding the past-like material in a state in which the paste-like material has the adhesion property or bonding property to the substrate together with the sheet-form mold;

releasing the temporary fixation of the sheet-form mold by the support member after the contact-bonding; and removing the sheet-form mold from the substrate, thereby transferring a three-dimensional structure onto the substrate;

wherein the support member is formed of a printing device in which a screen is provided with tension in a horizontal frame and a plate having flexibility is supported on the screen.

* * * * *